United States Patent
Raskovalov (10) Patent No.: US 11,281,991 B2
(45) Date of Patent: Mar. 22, 2022

(54) EFFICIENT DECISION TREE EVALUATION

(71) Applicant: Meta Platforms, Inc., Menlo Park, CA (US)

(72) Inventor: Denis Raskovalov, Bellevue, WA (US)

(73) Assignee: Meta Platforms, Inc., Menlo Park, CA (US)

(*) Notice: Subject to any disclaimer, the term of this patent is extended or adjusted under 35 U.S.C. 154(b) by 1076 days.

(21) Appl. No.: 15/806,303

(22) Filed: Nov. 7, 2017

(65) Prior Publication Data
US 2019/0138942 A1    May 9, 2019

(51) Int. Cl.
*G06N 20/00* (2019.01)
*G06N 5/04* (2006.01)

(52) U.S. Cl.
CPC ............. *G06N 20/00* (2019.01); *G06N 5/046* (2013.01)

(58) Field of Classification Search
CPC ........ G06N 20/00; G06N 20/20; G06N 5/003; G06N 5/046
See application file for complete search history.

(56) References Cited

U.S. PATENT DOCUMENTS

2014/0089908 A1* 3/2014 Dunn .................. G06F 8/443
717/151

OTHER PUBLICATIONS

Menendez et al., "ALIVE-INFER: Data-Driven Precondition Inference for Peephole Optimizations in LLVM", Jun. 23, 2017, PLDI'17, pp. 49-63 (Year: 2017).*

Chris Arthur Lattner, "LLVM: An Infrastructure for Multi-Stage Optimization", Master of Science Thesis, Graduate College of the University of Illinois at Urbana-Champaign, 2002, 68 pages.

* cited by examiner

*Primary Examiner* — Paulinho E Smith
*Assistant Examiner* — Brent Johnston Hoover
(74) *Attorney, Agent, or Firm* — FisherBroyles, LLP (57) ABSTRACT

A model optimization system can reduce the delays caused by cache misses and page faults by converting a model of one or more decision trees into machine code that is optimized to avoid these memory faults. The model optimization system can convert a model into machine code by converting each tree of the model into a series of nested if/then statements and converting each series of nested if/then statements into optimized machine code. In some implementations, the model can be converted into optimized machine code only when an amount of processing required to convert the model into the optimized machine code is less than the expected cost savings of using the optimized machine code, instead of an unmodified version of the model, over the life of the model.

20 Claims, 8 Drawing Sheets

EFFICIENT DECISION TREE EVALUATION

BACKGROUND

Predictive algorithms have become some of the most useful computing systems ever produced. Predictive algorithms have been developed for everything from weather patterns, to self-driving cars, to natural language processing, to movie suggestions. Predictive algorithms often achieve amazing results through the use of a machine learning engine. A "machine learning engine," refers to a construct that is trained using training data to make predictions for new data items, whether or not the new data items were included in the training data. Examples of machine learning engines include: neural networks, decision trees/decision forests (e.g. gradient boosting decision trees, or "GBDTs"), support vector machines, Parzen windows, and others. Machine learning engines can be configured for various situations, data types, sources, and output formats. For example, a social media provider can train a GBDT model to take user and advertisement characteristics try to predict which advertisements the user will click on.

Often, effectively applying a machine learning engine requires producing a result very quickly. In many contexts millions of these machine learning requests can occur contemporaneously. In addition, generating a result can require accessing large data sets, such as thousands of decision trees and arrays of thousands of features. For example, when a user visits a social media website, building the requested web page can be delayed until results from a machine learning engine are produced. The social media site may respond to millions of such requests each day as the billions of social media users' transitions between social media pages. As both the complexity and frequency of machine learning engine requests increase, there is an ever greater demand for optimizations to decrease the amount of processing power required to respond.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Embodiments for reducing processing required to evaluate decision tree models are described. Decision tree models, such as a collection of one or more gradient boosting decision trees, i.e. a "GBDT model," can be very effective in prediction, classification, and other machine learning activities. However, evaluating GBDT models can include various memory inefficiencies, such as cache misses and page faults. A model optimization system can alleviate some of these inefficiencies by converting the trees of a GBDT model into if/then statements and then generating corresponding machine code, for the if/then statements, that is optimized for avoiding memory inefficiencies. In some implementations, this conversion of a GBDT model to machine code can be performed only where the expected cost of the conversion is less than the expected cost savings from avoiding memory inefficiencies over the life of the GBDT model. While GBDT models are discussed below, this technology can also be used with other types of decision trees.

The trees in a GBDT model can be binary trees that are made up of condition nodes and value nodes. A condition node is a node with two child nodes and has a condition that specifies which child node should be selected next during evaluation of the tree, based on one or more features of an item under consideration. A value node is a leaf node of the tree that provides a result for the evaluation of that tree. A combination (e.g. sum) of the tree results can be used as the result of the GBDT model.

Evaluating a GBDT model can be performed by applying the GBDT model to a set of features, e.g. a "feature vector," for an item under consideration. While this disclosure refers to a "feature vector," other data structures can be used to reference the set of features such as an array, dictionary, individual variables, etc. Evaluation of unmodified GBDT models typically involves looping through each of the trees of the model, traversing each tree, starting at the root node, applying features from a feature vector to condition nodes until a value node is reached, and summing the values for the value node reached for each tree.

In some circumstances evaluation of a GBDT model can be delayed due to delays in retrieving data from memory. For example, the GBDT model can include many (e.g. thousands or millions) of trees. In addition, each tree in the GBDT model can include many (e.g. thousands or millions) of nodes. Furthermore, when evaluating a GBDT model against a feature vector, the feature vector can include many (e.g. thousands or millions) of features. During evaluation, if either or both the feature vector or GBDT model are relatively large in relation to the size of the processor's cache or physical memory, evaluation can be slower than necessary due to cache misses and page faults.

A "cache miss" occurs when the data need to perform an operation (e.g. to continue evaluation of a GBDT model against a feature vector) is not in the small but fast memory called the processor's cache. When a cache miss occurs, a comparatively slow process must be performed to load the needed data from a physical memory (e.g. RAM) into the cache. In an attempt to avoid future cache misses, data around the needed data (e.g. 64 bytes), referred to as a "cache line," is also loaded into the cache. For example, if a value from an array of 2 byte integers is needed, the needed array item and the next 31 items can be part of the cache line that is loaded into the cache. When the needed memory is also not already in the physical memory, a "page fault" occurs. To resolve a page fault, an even slower process occurs to retrieve a "page" containing the needed cache line from storage (e.g. a hard disk) and load it into the physical memory, and then load the cache line from the page in physical memory into the cache, to be available to the processor.

The prior art has not provided a method or constructing or evaluating GBDT models in a manner that minimizes cache misses and page faults. For example, a feature vector can include 5,000 float (4 byte) features and a tree in a GBDT model can include a root node that uses feature number 107, and child nodes A and B that use feature numbers 4,004 and 2,182, respectively. Assuming 64 byte cache lines, when the root node is evaluated, a cache line including feature items 107-123 can be loaded into the cache. The evaluation can indicate the next node should be the B node. Feature 2,182 for the B node is not in the cache, so a cache miss occurs, and features 2,182-2,198 are loaded. The B node can have value child nodes C and D. The evaluation of the B node can indicate the next node should be the C node. The value corresponding to the C node may also not be in cache, so it is retrieved and then returned as the result of the tree. Due to the cache misses, this process can take several times longer than it would if all the necessary data was loaded into the cache initially. Also, if any page faults occurred, this delay can be magnified much further. A process for evaluating an unconverted GBDT model is discussed in greater detail below in relation to FIG. 5.

A model optimization system can reduce the delays caused by cache misses and page faults by converting a GBDT model into machine code that is optimized to avoid these memory faults. As used herein, "optimized" or an "optimization" refers to an improvement in the state of the item optimized, not necessarily that the item optimized is in the best possible state. For example, a model optimized to avoid memory faults means the model is likely to produce less memory faults than it was before the optimization, while this optimization could be the minimum number of memory faults possible for evaluation of the model, it is not necessary to achieve such a minimum number of memory faults for this model to be optimized; e.g. the optimized model can be further optimized. The model optimization system can convert a GBDT model into machine code by converting each tree of the GBDT model into a series of nested if/then statements and converting each series of nested if/then statements into optimized machine code. The process for converting a GBDT model into optimized machine code is discussed additional detail below in relation to FIGS. 6A and 6B.

In some cases, the amount of processing required to convert a GBDT model into optimized machine code can be greater than the amount of processing saved by using the optimized machine code instead of the original GBDT model. The model optimization system can compute an expected amount of cost savings for the optimized machine code as opposed to the original GBDT model, over the life of the GBDT model. This computation can be based on profiling data for the GBDT model or profiling data for similar GBDT models. For example, the model optimization system can compute an expected cost savings likely to be obtained by the conversion based on an amount of cost savings achieved through conversions of similar GBDT models. The model optimization system can also compute an expected number of remaining evaluations using the GBDT model, e.g. based on historical use of the GBDT model and an expected lifetime of the GBDT model. The GBDT model can be converted into optimized machine code if the amount of processing to convert the GBDT model into the optimized machine code is less than the expected cost savings over the life of the GBDT model.

Figure 1:
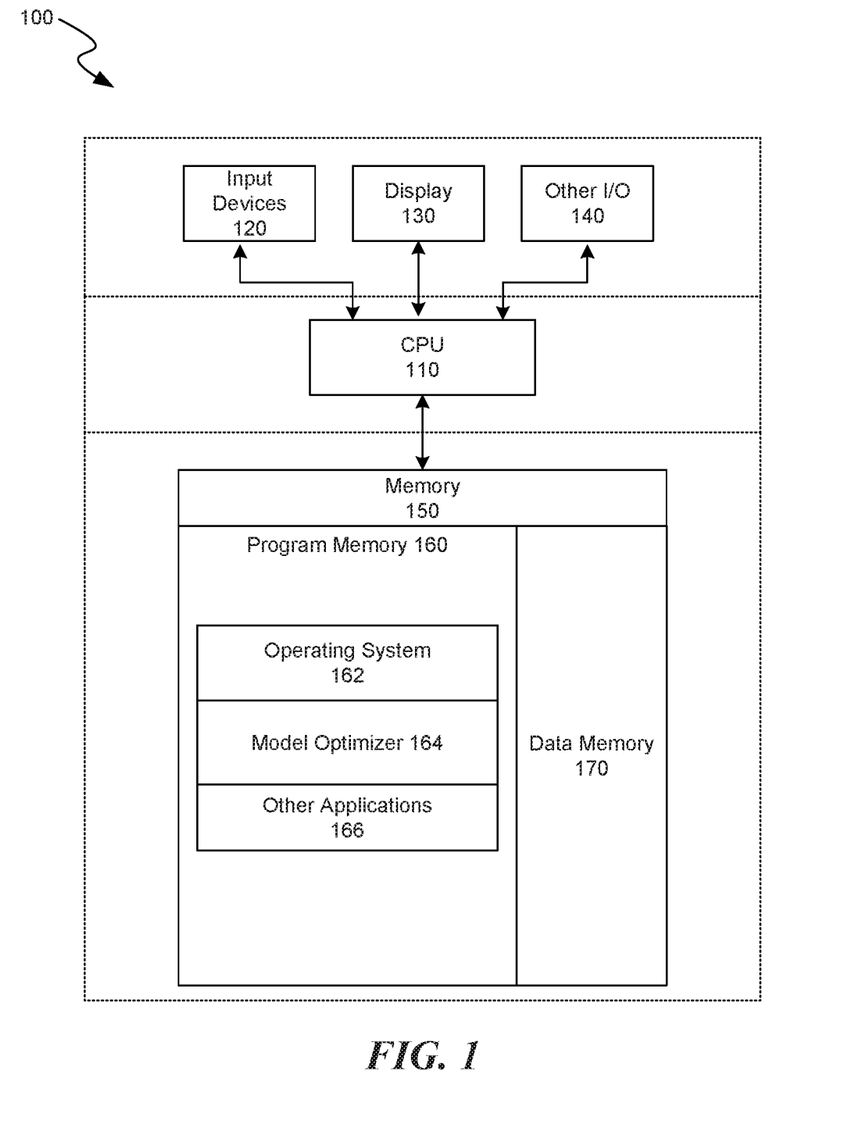
FIG. 1 is a block diagram illustrating an overview of devices on which some implementations can operate.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that reduces processing required to evaluate decision tree models. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, model optimizer 164, and other application programs 166. Memory 150 can also include data memory 170 that can include GBDT models, machine code, feature vectors, profiling data, conversion libraries (e.g. LLVM), configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
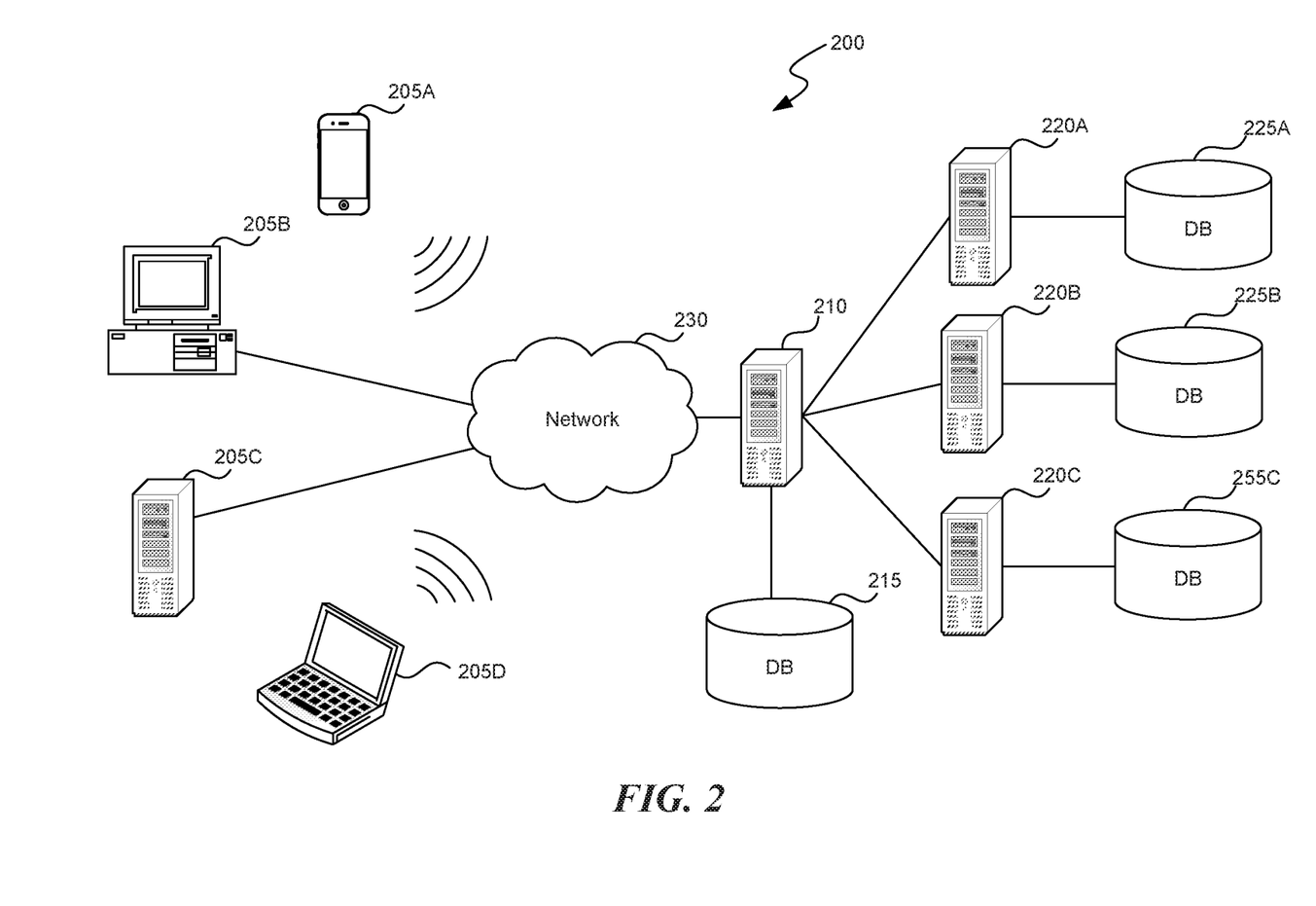
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as converted and unconverted GBDT models, feature vectors, profiling data, etc Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
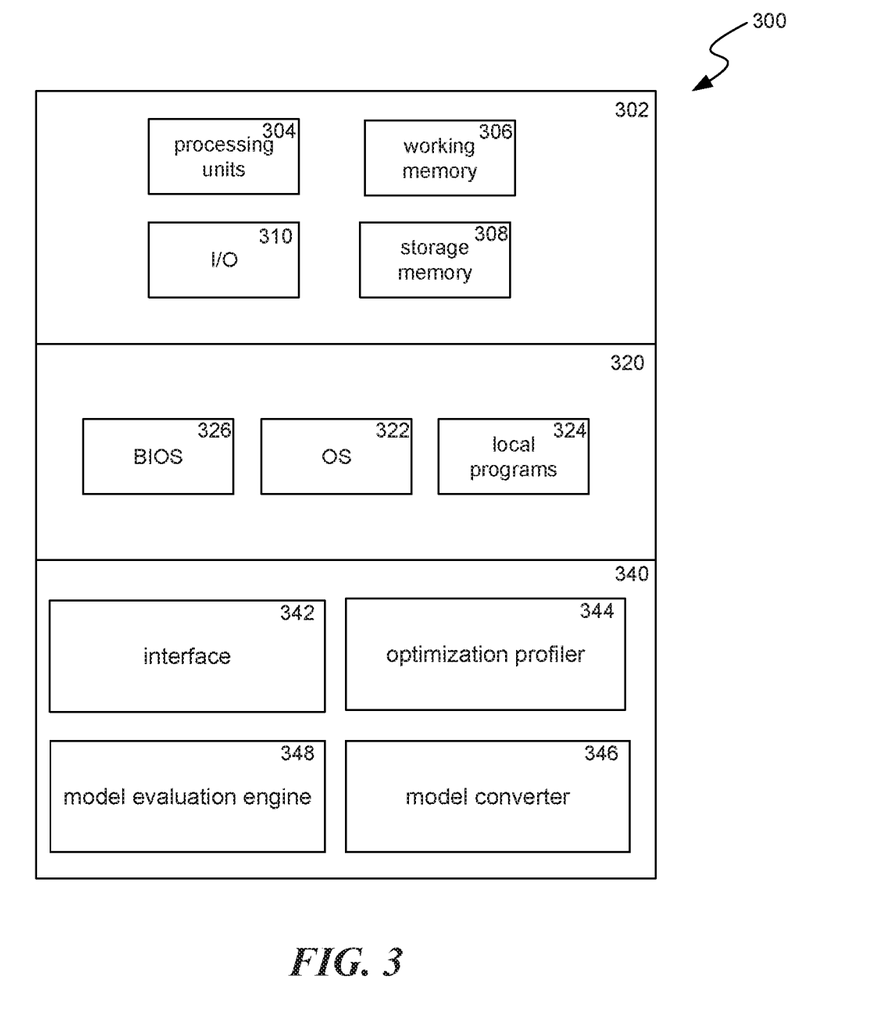
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include optimization profiler 344, model converter 346, model evaluation engine 348, and components which can be used for transferring data and controlling the specialized components, such as interface 342. In some implementations, any of components 300 can be in a computing system that is distributed across multiple computing devices or can be an interface to a server-based application executing one or more of specialized components 340.

Optimization profiler 344, can cause various GBDT model evaluations and characteristics to be monitored such as the overall execution time, amount of cache misses and page faults that occur, size of feature set used, number of nodes in the GBDT model, average or median number of nodes in the GBDT model trees, or etc.

Optimization profiler 344 can also receive profiled data about a particular GBDT model and determine whether it is likely to be computationally cost effective to convert the GBDT model into optimized machine code. Optimization profiler 344 can estimate the amount of processing required to convert a GBDT model to machine code. In some implementations, this estimation can be based on a function that takes characteristics of a GBDT model, such as its size, number of trees, etc., and computes the amount of processing that will be required to make the conversion. In other implementations, this estimation can be performed by a prediction model that estimates processing time based on the observed processing time of previous conversions of similar GBDT models.

Optimization profiler 344 can estimate the amount of processing that will be saved by converting a GBDT model to machine code over the life of the GBDT model. In some implementations, optimization profiler 344 can accomplish this by computing an expected cost of an individual execution of the GBDT model and multiplying that by an expected number of future evaluations of the GBDT model. In some implementations, the optimization profiler 344 can compute an expected cost of an individual execution of the GBDT model based on one or more of: the number of trees in the GBDT model, the average depth of the GBDT model trees, the total number of nodes across the GBDT model trees, etc. In some implementations, optimization profiler 344 can compute an expected cost of an individual evaluation of the GBDT model based on the evaluation time of other models and/or previous evaluation of the GBDT model. In some implementations, optimization profiler 344 can determine an expected number of evaluations of the GBDT model based on the total number of evaluations that occurred for other similar GBDT models, policies for how often GBDT models are updated, or etc.

When optimization profiler 344 determines that the expected cost of converting the GBDT model to machine code is less than the expected savings of using the machine code instead of the original GBDT model, it can cause model converter 346 to make the conversion. In some implementations, this can be done by starting a new processing thread to perform the conversion. The original GBDT model can be used to respond to evaluation requests until the conversion is complete.

Model converter 346 can receive a GBDT model and iterate through each of the trees of the GBDT model. In each iteration, model converter 346 can convert the current tree for that iteration to one or more nested if/then statements. Model converter 346 can generate the if/then statements recursively by starting at the root node as the current node and traversing the tree by emitting an if/then statement if the current node is a condition node and emitting a return statement if the current node is a value node. In some implementations, the emitted if/then statement can be generated by performing the operation (e.g. in C++): "if("+currentNode.condition+"){"+condition_true_result+"}else{"+condition-_false_result+"}" where currentNode.condition is the condition of the current node such as featureVector['age']>15, condition_true_result is the recursive call to the model converter 345, passing the subtree that is formed from the child node of the current node that is selected if the condition is true, and condition_false_result is the recursive call to the model converter 345, passing the subtree that is formed from the child node of the current node that is selected if the condition is false. As used herein, the portion of the if/then statement that occurs if the condition is true is referred to as the "then" portion while the portion of the if/then statement that occurs if the condition is false is referred to as the "else" portion. In some implementations, where the current node is a value node, the emitted return statement can be "return "+currentNode.value+";" where currentNode.value is the value of the current value node.

Model converter 346 can convert this emitted code to optimized machine code. In some implementations, this can be accomplished by applying a low-level virtual machine (LLVM) algorithm, described in LLVM: AN INFRASTRUCTURE FOR MULTI-STAGE OPTIMIZATION, by Chris Arthur Lattner, 2002, available at: http://llvm.org/pubs/2002-12-LattnerMSThesis.pdf, and incorporated herein by reference. In some implementations, converting the emitted code to optimized machine code can be performed using other optimization algorithms, such as other portions of compiler algorithms.

Model evaluation engine 348 can evaluate a given GBDT model in relation to a given feature vector. In various cases, the given GBDT model can be an unmodified GBDT model or a GBDT model converted to optimized machine code. Where the GBDT model is optimized machine code, model evaluation engine 348 can evaluate the model by evaluating, using the appropriate feature vector values from the given feature vector, the various nested if/then statements corresponding to each GBDT model tree, and summing the results. Where the GBDT model is an unmodified GBDT model, model evaluation engine 348 can evaluate the GBDT model by iterating through the model trees, in each iteration traversing a tree using the appropriate feature vector values from the given feature vector, and summing the values corresponding to the leaf nodes (i.e. value nodes) reached for each tree.

In some implementations, model evaluation engine 348 can begin evaluating an unmodified GBDT model with a feature vector while model converter 346 is generating the machine code version of the GBDT model in another processing thread. When the machine code version of the GBDT model is ready and if the evaluation of the unmodified GBDT model is not complete, the additional processing thread can begin evaluation of the machine code version of the GBDT model. The result from whichever evaluation completes first can be used, at which point the other evaluation can be stopped.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
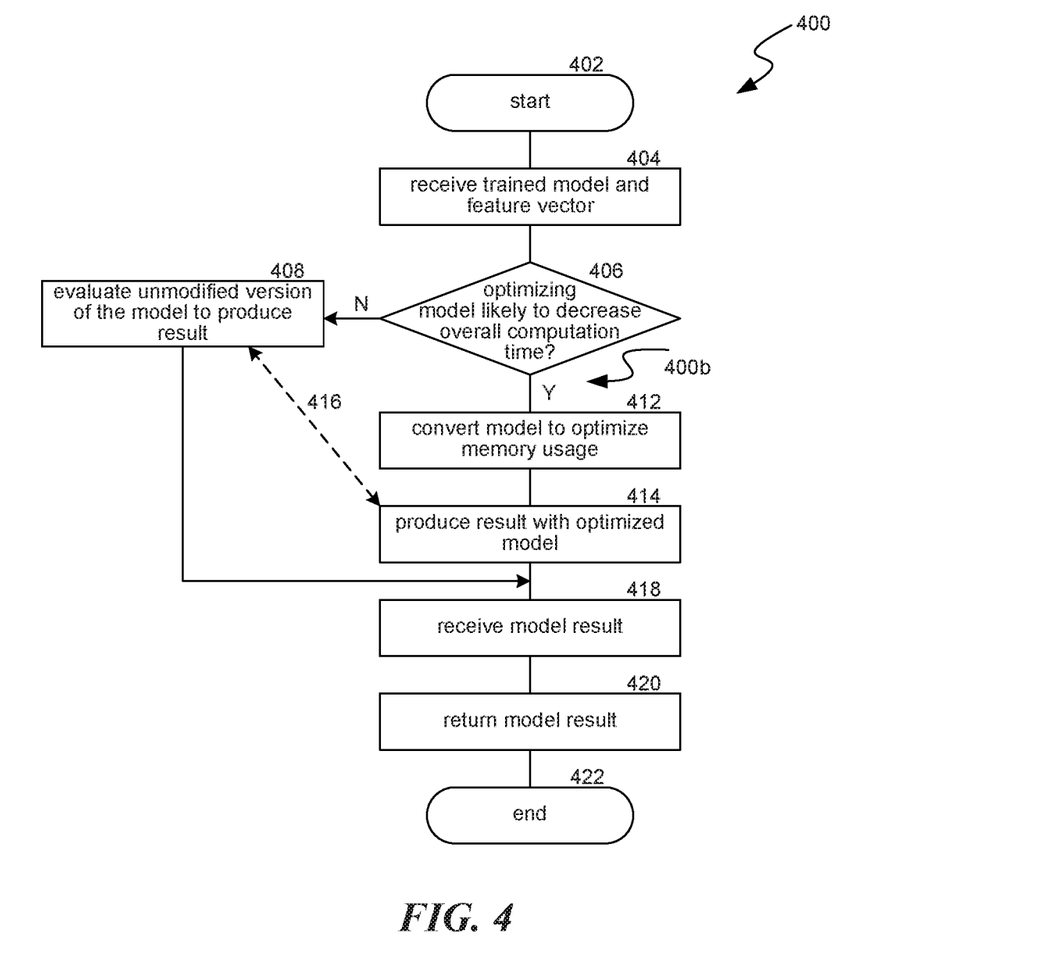
FIG. 4 is a flow diagram illustrating a process used in some implementations for reducing processing required to evaluate decision tree models.

FIG. 4 is a flow diagram illustrating a process 400 used in some implementations for reducing processing required to evaluate decision tree models. Process 400 begins at block 402 and continues to block 404. In some implementations, process 400 can be performed "just in time," e.g. as a response to a user request for evaluation of a GBDT model. In some implementations, process 400 can be performed ahead of time, e.g. when a GBDT model is created, on a schedule, or when servers are determined to have available processing capacity. At block 404, process 400 can receive a trained GBDT model. In cases where process 400 is initiated in response to a request to evaluate the GBDT model, the feature vector the GBDT model is to be evaluated against can also be received.

At block 406, process 400 can determine whether optimizing the GBDT model is likely to decrease overall processing time. Process 400 can accomplish this by comparing an expected amount of processing required to convert a GBDT model to machine code with an amount of processing expected to be saved by using the machine code instead of the unmodified GBDT model over the life of the model. Process 400 can estimate the amount of processing required to convert a GBDT model to machine code using a function defined to map characteristics of the GBDT model, such as its size, number of trees, etc., to an amount of processing that will be required to make the conversion. In some implementations, this function can be a prediction model that estimates processing time based on the observed processing time of previous conversions of similar GBDT models. For example, it can be observed that there is a direct correlation between the number of nodes in the GBDT model and the conversion processing time. In some implementations, this function can be a result of an analysis of the code used to perform the conversion, such as an evaluation of the number of instructions expected to be performed in various loops and conditional statement based on the number of trees in a GBDT model and the depth of each tree.

Process 400 can estimate the amount of processing that will be saved by converting a GBDT model to machine code over the life of the GBDT model by computing an expected cost of an individual execution of the GBDT model and multiplying that by an expected number of future evaluations of the GBDT model. Process 400 can compute an expected cost of an individual execution of the GBDT model based on one or more of: the number of trees in the GBDT model, the average depth of the GBDT model trees, the total number of nodes across the GBDT model trees, etc. In some implementations, an expected cost of an individual evaluation of the GBDT model can be based on the evaluation time of other models and/or previous evaluations of the GBDT model. In some implementations, process 400 can determine an expected number of evaluations of the GBDT model based on the total number of evaluations that occurred for other similar GBDT models, based on policies for how often GBDT models are updated, etc.

In some implementations, such as were the conversion of the GBDT model to machine codes is not part of a request to evaluate the GBDT model, but instead is performed ahead of time, e.g. when servers are determined to have available processing capacity, the processing cost for the conversion is much less, so the determination of whether the conversion is cost effective can be skipped. Instead, process 400 can continue from block 404 to 412 (described below). In addition, in this circumstance, no evaluation of the model may be needed at that time, so after block 412, process 400 can continue to block 422, where it ends.

Whether or not process 400 determines that the expected cost of converting the GBDT model to machine code is greater than the expected savings of using the machine code instead of the original GBDT model, if process 400 was initiated as part of a request to evaluate the GBDT model, process 400 can continue to block 408 for evaluation of the unmodified GBDT model. In some implementations, once process 400 determines that the expected cost of converting the GBDT model to machine code is less than the expected savings of using the machine code instead of the original GBDT model, process 400 can proceed to block 412, but not to block 408.

At block 408, process 400 can evaluate an unmodified version of the GBDT model in relation to the feature vector received at block 404, to produce a result of the GBDT model. Evaluation of the unmodified GBDT model in relation to the feature vector can include looping through the trees of the GBDT model, traversing each tree using feature vector values until a value node of the current trees reached, and computing a sum of the value nodes reached for the set of trees. Additional details regarding evaluation of an unmodified GBDT model are provided below in relation to FIG. 5.

If, at block 406, process 400 determines that the expected cost of converting the GBDT model to machine code is less than the expected savings of using the machine code instead of the original GBDT model, process 400 can initiate a new processing thread 400b, which continues to block 412. As discussed below, new processing thread 400b can convert the GBDT model to machine code at block 412 and begin evaluating the machine code at block 414 while process 400 performs evaluation of the unmodified GBDT model at block 408.

At block 412, process 400b can convert the GBDT model to machine code that optimizes memory usage. Converting the GBDT model to machine code can include converting each tree of the GBDT model to one or more nested if/then statements and executing a memory optimization algorithm on each if/then statement to convert it into optimized machine code. Additional details regarding converting a GBDT model to optimize machine code are provided below in relation to FIGS. 6A and 6B. The optimized machine code generated from block 412 can be stored and used in future evocations of the GBDT model instead of performing the evaluation of the unmodified GBDT model. Process 400b can then continue to block 414.

At block 414, process 400b can begin evaluation of the optimize machine code to produce a result for the GBDT model in relation to the feature vector received at block 404. Valuation of the optimize machine code can include processing the machine code version of each nested if/then statement corresponding to a model tree such that each if/then statement produces a resulting value, and computing a sum of the resulting values.

Once a result is produced for the GBDT model either through one of the processing at block 408 or 414, the processing at the other of block 408 or 414 can be terminated at step 416, as that result is no longer necessary. For example, if, once the GBDT model has been converted to machine code at block 412, the processing at 408 has already produced a result, the processing at block 414 is either never begun or can be halted. As another example, if the processing at block 414 produces a result before the processing at block 408 has produced a result, the processing at block 408 can be halted. This halting procedure is an optimization that is not necessary to produce an accurate result. Step 416 is shown in a dashed line indicated a communication between processes 400 and 400b, as opposed to a transition between blocks of the flow chart. Once a result is produced and the interruption of the alternate GBDT model evaluation is performed, process 400 continues to block 418 and process 400b ends. At block 418 the result produced at either block 408 or 414 is received. At block 420, the result received at block 418 is returned. Process 400 then continues to block 422, where it ends.

Figure 5:
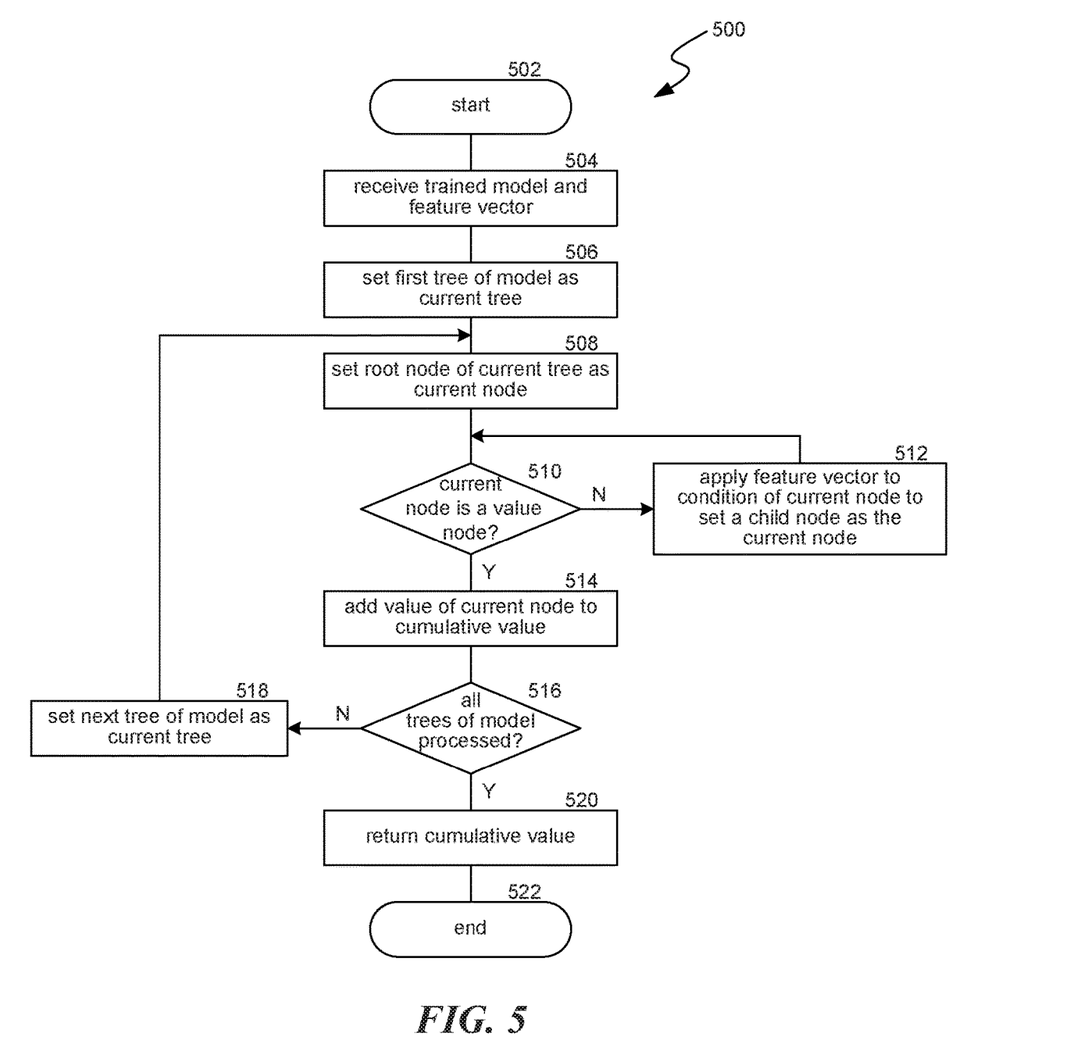
FIG. 5 is a flow diagram illustrating a process used in some implementations for evaluating unmodified decision tree models.

FIG. 5 is a flow diagram illustrating a process 500 used in some implementations for evaluating unmodified decision tree models. Process 500 begins at block 502 and continues to block 504. At block 504, process 500 can receive an unmodified GBDT model and a feature vector to evaluate the GBDT model against.

At block 506, process 500 can begin a loop that iterates through the trees of the received GBDT model. This loop begins at block 506 by setting a first tree of the GBDT model trees as a current tree.

At block 508, process 500 can set the root node of the current tree as a current node. At block 510, process 500 determines if the current node is a value node (as opposed to a condition node). Until such a value node is reached, process 500 returns from block 510 to block 512.

At block 512, the current node is a condition node and process 500 can evaluate the condition of the current node using one or more features, from the feature vector received at block 504, that are indicated in the condition of the condition node. Each condition node will have two children, one corresponding to the condition evaluation to true and the other corresponding to the condition evaluating to false. The child node corresponding to the result of the evaluation of the condition is set as the current node. Process 500 then continues back to block 510.

When a value node is reached at block 510, process 500 continues to block 514 where the value of the value node is added to a cumulative value. The cumulative value can be a variable that was initialized to zero and stores the sum of the values nodes reached for each of the trees of the GBDT model.

At block 516, process 500 can determine whether all the trees of the GBDT model have been evaluated. If not, process 500 continues to block 518 where the next tree from the GBDT model is set as the current tree to be operated on by the loop between blocks 508-518. If so, process 500 continues to block 520. At block 520, the cumulative value built up at block 514 is returned. Process 500 can then continue to block 522, where it ends.

Figure 6A:
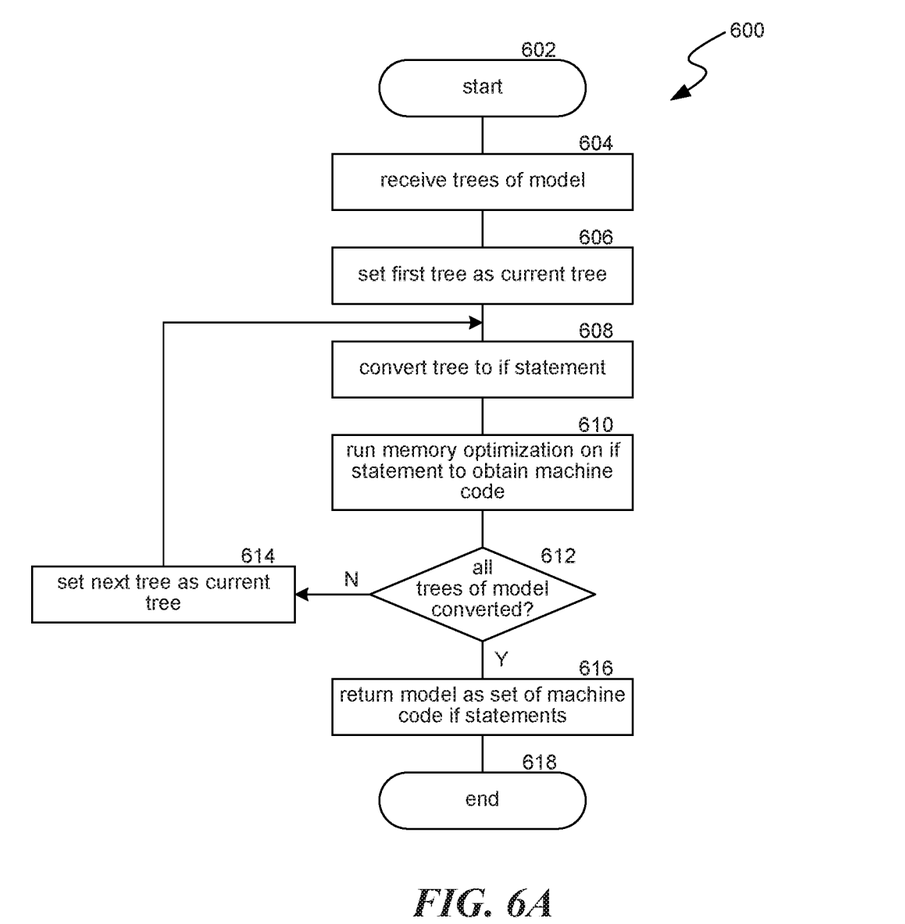
FIGS. 6A and 6B are flow diagrams illustrating processes used in some implementations for converting a decision tree model an optimized machine code version.

FIG. 6A is a flow diagram illustrating a process 600 used in some implementations for converting a decision tree model into an optimized machine code version. Process 600 begins at block 602 and continues to block 604. At block 604, process 600 can receive a set of binary trees from a model, e.g. a GBDT model.

At block 606, process 600 can begin a loop that iterates over the set of received trees, converting each to memory optimized machine code. Process 600 begins this loop at block 606 by setting a first tree or the received trees as a current tree.

At block 608, process 600 can convert the current tree to intermediate code comprising an if/then statement or multiple nested if/then statements when the current tree includes more than one condition node. Converting the current tree to the intermediate code statements can be accomplished by starting at a root node, and recursively emitting an if/then statement if the current node is a condition node. This if/then statement can be produced such that the recursive result for the current node's child for the true condition is in the then branch and the recursive result of the other child node for the false condition of the current node is in the else branch. Where the current node is a value node, code providing the value of the current node can be emitted. Additional details regarding converting a tree to one or more if/then statements are provided below in relation to FIG. 6B. Process 600 can then continue to block 610. Alternative methods that traverse the tree without recursion are also applicable.

At block 610, process 600 can perform a memory optimization algorithm, on the if/then statement(s) generated at block 608, to obtain an optimized machine code version of the if/then statement(s). In some implementations, this can be accomplished by applying a low-level virtual machine (LLVM) algorithm. In some implementations, process 600 can perform this conversation using other optimization algorithms, such as other portions of compiler algorithms or other algorithms that generate machine code in a manner that arranges the code to avoid cache misses and page faults.

At block 612, process 600 can determine whether all the received trees of the model have been converted to machine code. If not, process 600 continues to block 614 where the next tree from the model is set as the current tree to be operated on by the loop between blocks 608-614. If so, process 600 continues to block 616. At block 616, process 600 can return the version of the model with machine code instead of tree data structures. Process 600 can then continue to block 618, where it ends.

Figure 6B:
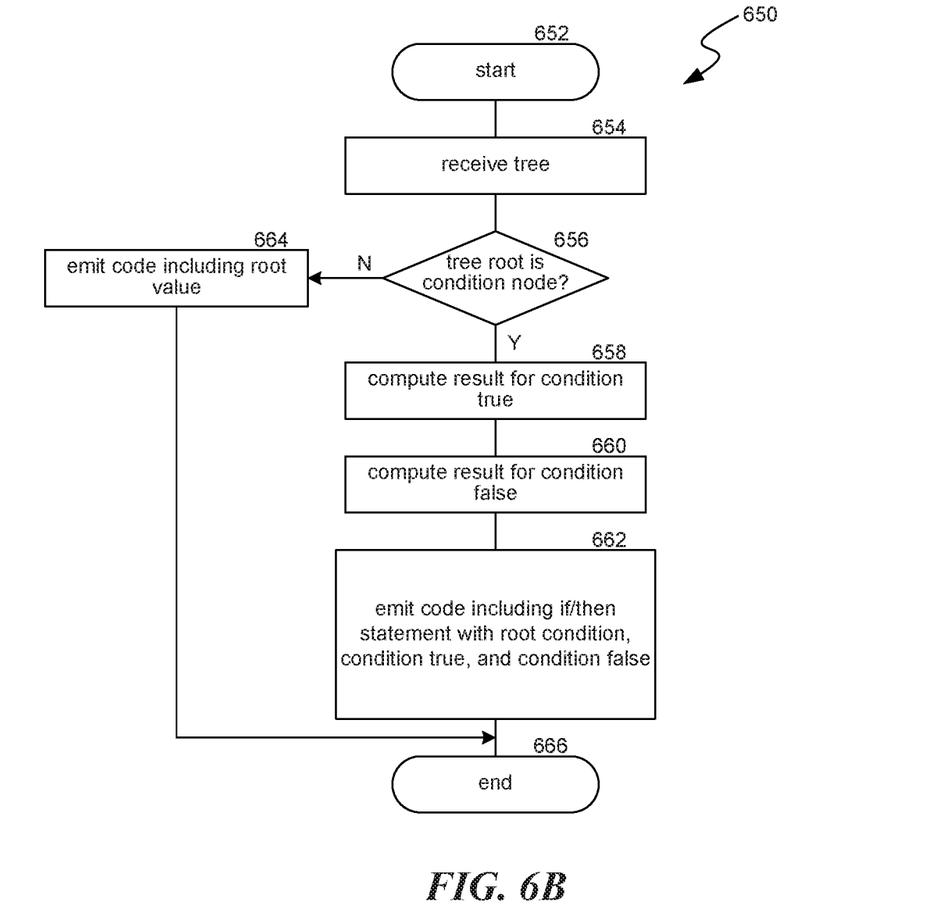

FIG. 6B is a flow diagram illustrating a process 650 used in some implementations for generating code that represents a decision tree. Process 650 begins at block 652 and continues to block 654. At block 654, process 650 can receive a binary tree, with at least one node, for conversion.

At block 656, process 650 can determine whether the root node of the received tree is a condition node. If not, meaning the tree contains only one node which is a value node, process 650 continues to block 664 where code for the value node is emitted. This can be code causing the value of the root node to be provided. For example, a C++ version of this emitted code can be generated by performing the operation: "return "+root.value+";" where root.value is the value of the root node. In some implementations, where the individual tree evaluation will be called in a loop instead of as a function call, the emitted code can be generated by performing the operation: "cumulative_value=cumulative_value "+root.value+";". While code examples provided herein are in C++, other similar operations can be performed in for emitting intermediate code in other programming languages.

If, at block 656, the root node is a condition node, meaning the root node has two child nodes, one corresponding to the true result of the condition and one corresponding to the false result, process 650 can continue to block 658. At block 658, process 650 can compile a result (e.g. condition_true_result) for the subtree starting with the child node corresponding to the condition of the root node of the received tree being true. In some implementations, process 650 can accomplish this by invoking a new (e.g. recursive) call to process 650, passing to this new invocation the subtree that starts with the child node corresponding to the condition of the root node of the received tree being true. Process 650 can then continue to block 660.

At block 660, process 650 can compile a result (e.g. condition_false_result) for the subtree starting with the child node corresponding to the condition of the root node of the received tree being false. In some implementations, process 650 can accomplish this by invoking a new (e.g. recursive) call to process 650, passing to this new invocation the subtree that starts with the child node corresponding to the condition of the root node of the received tree being false. Process 650 can then continue to block 662.

At block 662, process 650 can emit an if/then/else statement that incorporates the condition of the root node, the condition_true_result from block 658, and the condition_false_result from block 660. In some implementations, the emitted code can be generated by performing operations such as: "if("+nodeCondition+"){"+condition_true_result+} else {"+condition_false_result"+}" where nodeCondition is the string representation of the condition from the root node, condition_true_result is the result generated at block 658, and condition_false_result is the result generated at block 660. This example is for the C++ language, other similar code emissions can be used for other programming languages. While process 650 is provided as a recursive algorithm, the same result can be generated using an algorithm that uses a loop to walk each node of the received tree. Process 650 can then continue to block 666, where it ends.

Figure 7:
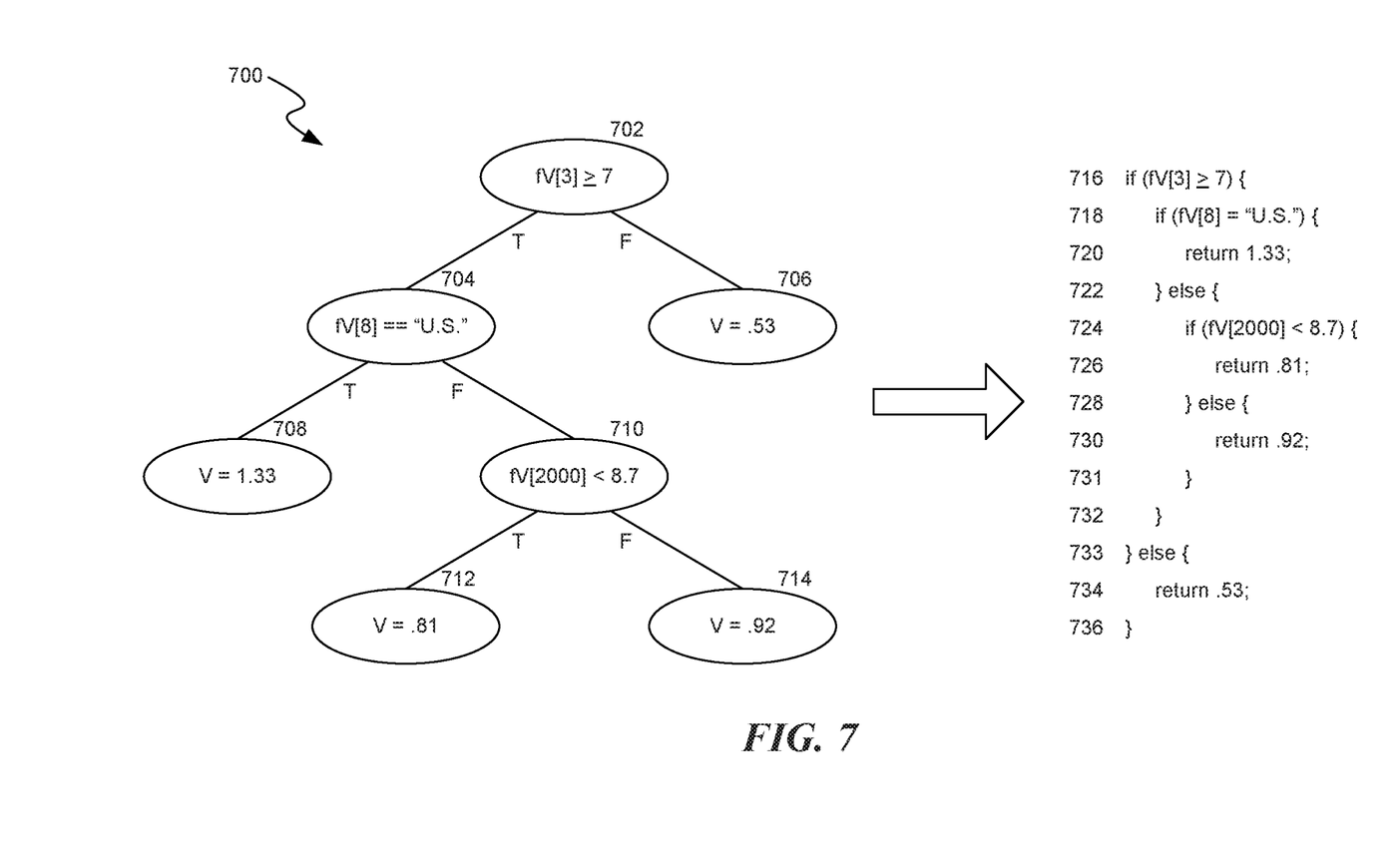
FIG. 7 is a conceptual diagram illustrating an example of intermediate code generated to represent a decision tree.

FIG. 7 is a conceptual diagram illustrating an example 700 of intermediate code generated to represent a decision tree. Example 700 includes a GBDT model tree with nodes 702-714 and emitted intermediate code with code lines 716-736, which would be produced through process 650. In example 700, "fV" is a unspecified feature vector.

Example 700, applying process 650, would start at root node 702, this is a decision node so a process 650b would be called, passing it the tree made from nodes 704 and 708-714 to determine a condition_true_result for node 702. Also, process 650c would be called, passing it the tree made from node 706 to determine a condition_false_result for node 702.

Process 650b would start at root node 704, this is a decision node so a process 650d would be called, passing it the tree made from node 708 to determine a condition_true_result for node 704. Also, process 650e would be called, passing it the tree made from nodes 710-714 to determine a condition_false_result for node 704.

Process 650d would start at root node 708, this is a value node, so it would return a code segment representing the value of value node 708, such as "return 1.33", which is used as code line 720.

Process 650e would start at root node 710, this is a decision node so a process 650f would be called, passing it the tree made from node 712 to determine a condition_true_result for node 710. Also, process 650g would be called, passing it the tree made from node 714 to determine a condition_false_result for node 710.

Process 650f would start at root node 712, this is a value node, so it would return a code segment representing the value of value node 712, such as "return 0.81", which is used as code line 726.

Process 650g would start at root node 714, this is a value node, so it would return a code segment representing the value of value node 714, such as "return 0.92", which is used as code line 730.

Now that process 650f and 650g have returned results to process 650e, process 650e can return a code segment using the condition from node 710 and the condition_true_result returned from 650f and the condition_false_result returned from 650g. For example, process 650e can return the code segment from lines 724-731.

Now that process 650d and 650e have returned results to process 650b, process 650b can return a code segment using the condition from node 704 and the condition_true_result returned from 650d and the condition_false_result returned from 650e. For example, process 650b can return the code segment from lines 718-732.

Process 650c would start at root node 706, this is a value node, so it would return a code segment representing the value of value node 706, such as "return 0.53", which is used as code line 733.

Finally, now that process 650b and 650c have returned results to process 650, process 650 can return a code segment using the condition from node 702 and the condition_true_result returned from 650b and the condition_false_result returned from 650c. For example, process 650 can return the code shown in lines 716-736.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for generating an updated version of a model, the method comprising:
   identifying at least one memory access inefficiency associated with an evaluation of a decision tree model; and
   based on determining that an expected amount of processing cost associated with generating updated machine code for the decision tree model is less than an expected amount of processing cost savings incurred by the use of the updated machine code, generating an updated version of the decision tree model, the generating comprising:
   converting the decision tree model comprising a plurality of nodes into intermediate code by traversing the decision tree model and, for each particular node reached during the traversal, emitting one of:
   an if/then statement when the particular node is a condition node; or
   a statement incorporating a value of the particular node when the particular node is a value node;

converting the intermediate code, corresponding to the decision tree model, into machine code updated to avoid the at least one memory access inefficiency; and storing the updated machine code as the updated version of the decision tree model.

2. The method of claim 1, wherein:

a first code segment corresponding to a first subtree of the particular node is in a then portion of the if/then statement; and a second code segment corresponding to a second subtree of the particular node is in an else portion of the if/then statement.

3. The method of claim 1, further comprising evaluating the updated version of the decision tree model by:

retrieving the stored updated machine code;

evaluating multiple sections of the retrieved updated machine code, each section of the updated machine code corresponding to a decision tree of one or more decision tree data structures included in the updated version of the decision tree model, and evaluation of each section comprises reaching an instruction corresponding to a value node, the reached instruction indicating a result value; and computing a sum of the result values indicated by all of the reached instructions corresponding to a value node.

4. The method of claim 1, wherein:

the condition node is a root of the decision tree model;

each condition node has a first subtree corresponding to the condition being true and a second subtree corresponding to the condition being false; and the traversing of the decision tree model comprises, for each particular node reached during the traversal:

performing a first call to a recursive function wherein the first call passes, to the recursive function, the first subtree of the particular node; and performing a second call to the recursive function wherein the second call passes, to the recursive function, the second subtree of the particular node.

5. The method of claim 1, wherein the converting the intermediate code, corresponding to the decision tree model, into updated machine code is performed by calling a low-level virtual machine ("LLVM") algorithm, passing to the LLVM algorithm the intermediate code, and receiving back the updated machine code.

6. The method of claim 1, wherein:

generating the updated version of the decision tree model further comprises initializing a new processing thread;

the new processing thread performs the converting of the decision tree model into the intermediate code; and the new processing thread performs the converting of the intermediate code into the updated machine code.

7. The method of claim 6, wherein:

the evaluation of the decision tree model is in relation to a feature vector;

the method further comprises initiating, by the new processing thread, an evaluation of the updated version of the decision tree model in relation to the feature vector; and either:

in response to completion of the evaluation of the decision tree model, halting the evaluation of the updated version of the decision tree model; or in response to completion of the evaluation of the updated version of the decision tree model, halting the evaluation of the decision tree model.

8. The method of claim 7, wherein the evaluation of the decision tree model comprises:

iterating through at least one binary decision tree data structure included in the decision tree model, the iterating beginning with a root node of the binary decision tree data structure, and traversing to a leaf node of the binary decision tree data structure, wherein:

a transition between a parent node to a child node of the parent node is based on an evaluation of a condition associated with the parent node in relation to one or more values from the feature vector; and each reached leaf node is associated with a value; and computing a sum of the values associated with each of the reached leaf nodes.

9. A non-transitory computer-readable storage medium storing instructions that, when executed by a computing system, cause the computing system to perform operations for generating an updated version of a model, the operations comprising:

identifying at least one memory access inefficiency associated with an evaluation of a decision tree model; and based on determining that an expected amount of processing cost associated with generating updated machine code for the decision tree model is less than an expected amount of processing cost savings incurred by the use of the updated machine code, generating an updated version of the decision tree model, the generating comprising:

converting the decision tree model comprising a plurality of nodes into intermediate code by traversing the decision tree model and, for each particular node reached during the traversal, emitting one of:

an if/then statement when the particular node is a condition node; or a statement incorporating a value of the particular node when the particular node is a value node;

converting the intermediate code, corresponding to the decision tree model, into machine code updated to avoid the at least one memory access inefficiency; and storing the updated machine code as the updated version of the decision tree model.

10. The non-transitory computer-readable storage medium of claim 9, wherein:

a first code segment corresponding to a first subtree of the particular node is in a then portion of the if/then statement; and a second code segment corresponding to a second subtree of the particular node is in an else portion of the if/then statement.

11. The non-transitory computer-readable storage medium of claim 9, wherein the instructions cause the computing system to perform operations further comprising evaluating the updated version of the decision tree model by:

retrieving the stored updated machine code;

evaluating multiple sections of the retrieved updated machine code, each section of the updated machine code corresponding to a decision tree one or more decision tree data structures included in the updated version of the decision tree model, and evaluation of each section comprises reaching an instruction corresponding to a value node, the reached instruction indicating a result value; and computing a sum of the result values indicated by all of the reached instructions corresponding to a value node.

12. The non-transitory computer-readable storage medium of claim 9, wherein the converting the intermediate code, corresponding to the decision tree model, into updated machine code is performed by calling a low-level virtual machine ("LLVM") algorithm, passing to the LLVM algorithm the intermediate code and receiving back the updated machine code.

13. The non-transitory computer-readable storage medium of claim 12, wherein:
generating the updated version of the decision tree model further comprises initializing a new processing thread;
the new processing thread performs the converting of the decision tree model into the intermediate code; and
the new processing thread performs the converting the intermediate code into the updated machine code.

14. A system for generating an updated version of a model, the system comprising:
one or more processors; and
a memory storing instructions that, when executed by the one or more processors, cause the system to perform operations comprising:
identifying at least one memory access inefficiency associated with an evaluation of a decision tree model; and
based on determining that an expected amount of processing cost associated with generating updated machine code for the decision tree model is less than an expected amount of processing cost savings incurred by the use of the updated machine code, generating an updated version of the decision tree model, the generating comprising:
converting the decision tree model comprising a plurality of nodes into intermediate code by traversing the decision tree model and, for each particular node reached during the traversal, emitting one of:
an if/then statement when the particular node is a condition node; or
a statement incorporating a value of the particular node when the particular node is a value node;
converting the intermediate code, corresponding to the decision tree model, into machine code updated to avoid the at least one memory access inefficiency; and
storing the updated machine code the updated version of the decision tree model.

15. The system of claim 14, wherein the operations further comprise evaluating the updated version of the decision tree model by:
retrieving the stored updated machine code;
evaluating multiple sections of the retrieved updated machine code, each section of the updated machine code corresponding to a decision tree of one or more decision tree data structures included in the updated version of the decision tree model, and evaluation of each section comprises reaching an instruction corresponding to a value node, the reached instruction indicating a result value; and
computing a sum of the result values indicated by all of the reached instructions corresponding to a value node.

16. The system of claim 15, wherein:
generating the updated version of the decision tree model further comprises initializing a new processing thread;
the new processing thread performs the converting of the decision tree model into the intermediate code; and
the new processing thread performs the converting of the intermediate code into the updated machine code.

17. The method of claim 1, wherein the at least one memory access inefficiency is one of a cache miss or a page fault.

18. The method of claim 1, wherein the updated machine code loads a cache line into cache of a processor executing the updated machine code to avoid the at least one memory access inefficiency.

19. The method of claim 1, wherein the decision tree model is a gradient boosting decision tree model.

20. The method of claim 1, wherein:
identifying at least one memory access inefficiency associated with an evaluation of a decision tree model comprises monitoring at least one characteristic of the decision tree model; and
the at least one characteristic of the decision tree model is one of an overall execution time for the decision tree model, a size of a feature set used by the decision tree model, or a number of nodes included in the decision tree model.

* * * * *

UNITED STATES PATENT AND TRADEMARK OFFICE
CERTIFICATE OF CORRECTION

PATENT NO. : 11,281,991 B2
APPLICATION NO. : 15/806303
DATED : March 22, 2022
INVENTOR(S) : Denis Raskovalov Page 1 of 1

It is certified that error appears in the above-identified patent and that said Letters Patent is hereby corrected as shown below:

In the Claims

In Column 17, Line 41, in Claim 14, delete "code the" and insert -- code as the --.

Signed and Sealed this
Twenty-first Day of June, 2022

*Katherine Kelly Vidal*

Katherine Kelly Vidal
*Director of the United States Patent and Trademark Office*